(12) United States Patent
Radovic et al.

(10) Patent No.: US 8,756,363 B2
(45) Date of Patent: Jun. 17, 2014

(54) EFFICIENT STORAGE OF MEMORY VERSION DATA

(75) Inventors: Zoran Radovic, San Jose, CA (US); Graham Ricketson Murphy, Sunnyvale, CA (US); Bharat K. Daga, Bangalore (IN)

(73) Assignee: Oracle International Corporation, Redwood City, CA (US)

( * ) Notice: Subject to any disclaimer, the term of this patent is extended or adjusted under 35 U.S.C. 154(b) by 306 days.

(21) Appl. No.: 13/178,240

(22) Filed: Jul. 7, 2011

(65) Prior Publication Data

US 2013/0013843 A1   Jan. 10, 2013

(51) Int. Cl.
*G06F 12/00* (2006.01)

(52) U.S. Cl.
USPC ............. 711/5; 711/156; 711/162; 711/173

(58) Field of Classification Search
USPC ...................... 711/5, 156, 162, 173
See application file for complete search history.

(56) References Cited

U.S. PATENT DOCUMENTS

| | | |
|---|---|---|
| 3,868,632 A | 2/1975 | Hong |
| 4,608,687 A | 8/1986 | Dutton |
| 4,646,312 A | 2/1987 | Goldsbury |
| 5,081,626 A | 1/1992 | Scott |
| 5,276,834 A | 1/1994 | Mauritz et al. |
| 5,745,508 A | 4/1998 | Prohofsky |
| 5,872,798 A | 2/1999 | Baggen et al. |
| 6,035,432 A | 3/2000 | Jeddeloh |
| 6,480,982 B1 | 11/2002 | Chan et al. |
| 6,973,613 B2 | 12/2005 | Cypher |
| 7,020,811 B2 | 3/2006 | Byrd |
| 7,103,824 B2 | 9/2006 | Halford |
| 7,188,296 B1 | 3/2007 | Cypher |
| 7,257,666 B2 * | 8/2007 | Komatsu et al. ............. 711/103 |
| 7,530,008 B2 | 5/2009 | Das et al. |
| 2008/0022154 A1 * | 1/2008 | Endou ............................ 714/30 |
| 2011/0029809 A1 * | 2/2011 | Dhuse et al. ..................... 714/6 |

* cited by examiner

*Primary Examiner* — Gurtej Bansal
(74) *Attorney, Agent, or Firm* — Rory D. Rankin; Meyertons, Hood, Kivlin, Kowert & Goetzel, P.C.

(57) ABSTRACT

Systems and methods for efficient memory corruption detection in a processor. A processor detects a first data structure is to be allocated in a physical memory. The physical memory may be a DRAM with a spare bank of memory reserved for a hardware failover mechanism. Either the processor or an operating system (OS) determines a first version number corresponding to the first data structure. During initialization of the first data structure, the first version number may be stored in a first location in the spare bank. The processor receives from the OS a pointer holding the first version number. When the processor executes memory access operations targeting the first data structure, the processor compares the first version number with a third version number stored in a location in the physical memory indicated by the memory access address. The processor may set a trap in response to determining a mismatch.

17 Claims, 7 Drawing Sheets

Truth Table 400

| MISMATCH | | Memory Stored Version Number | | |
|---|---|---|---|---|
| | | A | B | Reserved |
| Memory Access Address Version Number from Processor | A | 0 | 1 | 0 |
| | B | 1 | 0 | 0 |
| | Reserved | 1 | 1 | 0 |

EFFICIENT STORAGE OF MEMORY VERSION DATA

BACKGROUND OF THE INVENTION

1. Field of the Invention

This invention relates to computing systems, and more particularly, to efficient memory corruption detection.

2. Description of the Relevant Art

Memory corruption occurs when the contents of a memory location are unintentionally modified due to programming errors. An example of this could be the access of a byte of memory past the end of the array of bytes reserved for a particular data structure. In addition, memory corruption may occur when the contents of a memory location are intentionally modified by a malicious attack. When the corrupted memory contents are used later in the computer program, it may lead either to a program crash or to strange program behavior. Regarding the first case, some programming languages include features such as explicit memory management and pointer arithmetic. These features allow development of efficient applications and system software. However, when a computer programmer incorrectly uses these features, memory corruption may occur. The programming languages C and C++ are two examples of such languages.

The behavior of programming languages may be categorized at least with type safety and memory safety. A computer programming language may be characterized as "type safe" when the language does not permit a computer programmer to use a value as a data type to which it does not belong. For example, a type safe programming language does not allow conversion of an integer variable to be a pointer value. The C programming language is one example of a "type unsafe" language due to casting, particularly the casting of pointers to void pointers and back. The C++ programming language includes most of the C programming language as a subset. Therefore, the C++ programming language inherits the "type unsafe" property.

A computer programming language may be characterized as "memory safe" when the language allows programs to release a portion of memory when it is determined the portion of memory is unused for the remainder of the program evaluation. A programming language that is "memory unsafe" may cause security vulnerabilities with random-access memory (RAM) access, such as buffer overflows and dangling pointers. Programming languages, such as C and C++, that support arbitrary pointer arithmetic, casting, and deallocation are typically "memory unsafe". Some high-level programming languages are memory safe due to disallowing pointer arithmetic and casting, and enforcing tracing garbage collection. However, programming efficiency may be reduced. Type safety typically depends on memory safety.

Many malicious attacks reduce system security through memory corruption. A pointer may be referred to as tainted if user input can be used as the pointer value. A security attack may be detected whenever a tainted value is de-referenced during program execution. Programming errors allow attackers to create memory corruption attacks, wherein these errors include vulnerabilities regarding buffer overflow, heap corruption (such as heap buffer overflow and double free), integer overflow, and format strings.

There are software solutions for memory corruption detection. Debugging tools such as Oracle Solaris Studio, Purify, Valgrind, and Insure++ perform this detection. However, these debuggers typically perform instrumentation of the computer program, which may cause program execution to run hundreds of times slower.

In view of the above, efficient methods and mechanisms for memory corruption detection are desired.

SUMMARY OF THE INVENTION

Systems and methods for efficient memory corruption detection are contemplated.

In one embodiment, during execution of a computer program, a processor detects a first array is to be allocated in a physical memory. The processor may begin executing a subroutine for dynamic memory allocation. The physical memory may be a DRAM with a spare bank of memory reserved for a hardware failover mechanism. Either the processor or an operating system (OS) determines a first version number corresponding to the first array. If the OS determines the first version number, the OS may do so after receiving an indication from the processor for allocating the first array. If the processor determines the first version number, the processor may send the first version to the OS with the indication for allocating the first array. The processor may initialize the first array by executing a series of block initialize store operations. The first version number may be stored in a first location in the spare bank within the physical memory. This first location may be associated with a second location outside the spare bank in the physical memory storing the first array. The processor may receive from the OS a pointer indicating the second location, wherein the pointer holds the first version number.

When the processor executes memory access operations targeting the first array, the processor generates a memory access address using at least the received pointer and the first version number stored in the pointer. The processor compares the first version number with a third version number stored in a location in the physical memory indicated by the memory access address. The processor sets a trap in response to determining at least the first version number and the third version number are different and the third version number stored in physical memory does not hold a value indicating a hardware failure occurred in the physical memory.

These and other embodiments will become apparent upon reference to the following description and accompanying drawings.

BRIEF DESCRIPTION OF THE DRAWINGS

FIG. 4 is a generalized block diagram illustrating one embodiment of a truth table for a version number mismatch.

Figure 1:
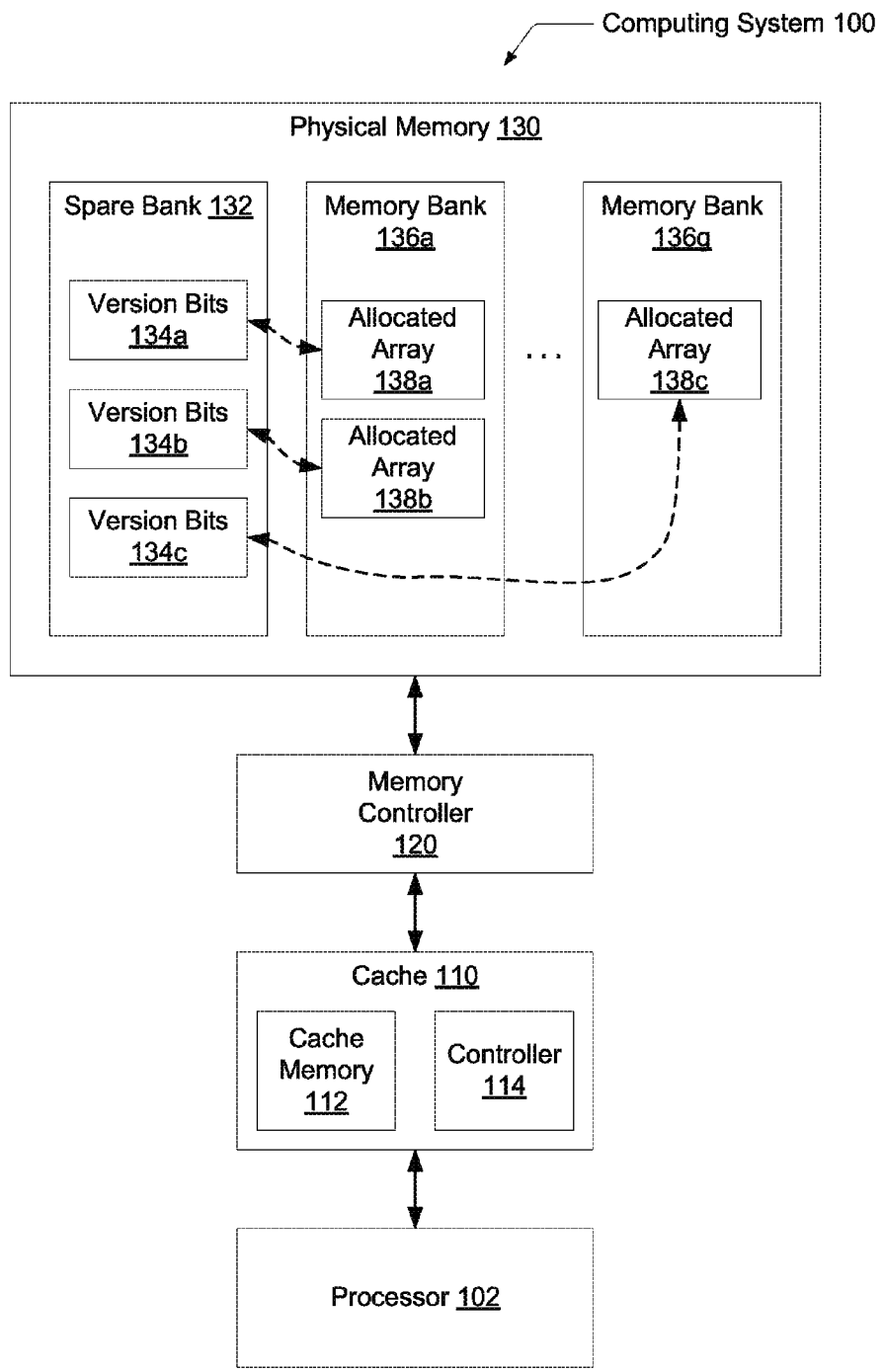
FIG. 1 is a generalized block diagram illustrating one embodiment of a computing system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, signals, computer program instruction, and techniques have not been shown in detail to avoid obscuring the present invention.

Referring to FIG. 1, a generalized block diagram illustrating one embodiment of a computing system 100 is shown. System 100 includes a processor 102 comprising one or more cores and one or more levels of a cache memory subsystem. System 100 also includes cache 110, which is within the memory subsystem, a memory controller 120 and physical memory 130. Physical memory 130 may be coupled to lower levels of a memory hierarchy, such as a disk memory and offline archive memory. These lower levels of memory are not shown for ease of illustration. Although only one processor 102 is shown coupled with an associated cache 110, it is possible and contemplated system 100 may include multiple processors and multiple associated caches coupled to a crossbar (not shown) to connect these components to one or more memory controllers. The one or more memory controllers are coupled to physical memory 130. In one embodiment, physical memory 130 comprises dynamic random access memory (DRAM). The DRAM may include one or more dual in-line memory module (DIMM) slots.

Each of the one or more cores within the processor 102 may include a superscalar microarchitecture with one or more multi-stage pipelines. Also, each core may be designed to execute multiple threads. For example, a multi-thread software application may have each of its software threads scheduled to be executed on a separate pipeline within a core, or alternatively, a pipeline may process multiple threads via control at certain function units.

In one embodiment, each of the cores within processor 102 includes circuitry for executing instructions according to a predefined general-purpose instruction set. For example, the SPARC® instruction set architecture (ISA) may be selected. Alternatively, the x86, x86-64®, Alpha®, PowerPC®, MIPS®, PA-RISC®, or any other instruction set architecture may be selected. Generally, each of the cores within processor 102 accesses an on-die level-one (L1) cache within a cache memory subsystem for data and instructions. The processor 102 may include multiple on-die levels (L2, L3 and so forth) of caches. If a requested block is not found in the on-die caches or in the off-die cache 110, then a read request for the missing block may be generated and transmitted to the memory controller 120. Interfaces between the different levels of caches may comprise any suitable technology. As shown in cache 110, each level of the caches may comprise a cache memory 112 for storing metadata and data. Additionally, each level may comprise a cache controller 114 for access control of the cache memory 112.

In one embodiment, the physical memory 130 may comprise error-correcting code (ECC) DRAM. The ECC-capable DRAM may detect and correct single-bit data errors and may detect double-bit data errors. Memory errors may be characterized as either soft errors or hard errors. The soft errors may be transient and occasional. With both the node capacitance and the supply voltage decreasing over time with the next generations of new processors, the amount of electrical charge stored on a node decreases. Due to this fact, nodes used for storage are more susceptible to radiation induced soft errors caused by high-energy particles such as cosmic rays, alpha particles, and neutrons. This radiation creates minority carriers at the source and drain regions of transistors to be transported by the source and drain diodes. The change in charge compared to the total charge, which is decreasing with each generation, stored on a node may be a large enough percentage that it surpasses the circuit's noise margin and alters the stored state of the node. Although the circuit is not permanently damaged by this radiation, a logic failure may occur. The hard errors may be permanent and may be found in the silicon or in the metallization of the dynamic RAM (DRAM) packaging.

Regardless of the type of error, the number of data bits in an error may alter the system behavior. Single-bit errors are usually correctable in an ECC memory system. For the above reasons, memories such as the DRAM in physical memory 130 may use error-correcting code (ECC) to detect and correct soft errors. The ECC DRAM may use additional bits called ECC bits to calculate parity information. The parity information is stored with the data bits in the DRAM. In one embodiment, the memory controller 120 calculates the parity information. When data is read from the DRAM, the memory controller 120 computes a new parity value and compares it with a stored parity value for the data being read. If there is a mismatch, then the memory controller 120 may detect the faulty bit and invert it. The error may be reported in a systems management log. If a multi-bit error occurs, the error may be detected and logged but not corrected. Multi-bit errors may be fatal if a system cannot recover from them.

Spare-bank memory and memory mirroring are other advanced mechanisms that enable systems to handle memory errors, such as multi-bit errors. In one embodiment, the physical memory 130 comprises a spare-bank DRAM. The spare-bank memory feature may be implemented in the memory controller 120 and the system basic input/output system (BIOS) software. This feature enables administrators to configure a spare row, or bank, of memory for spare use.

In one embodiment, if a number of correctable errors that occur within a certain time frame on a particular DIMM in any of the usable banks exceeds a given threshold set in the BIOS, then the BIOS instructs the memory controller 120 to copy the data from the failing bank to the spare bank. Then the memory controller 120 remaps the memory in the system. After the copy process has completed, the failing bank is no longer used. Instead the spare bank is used. As shown, the physical memory 130 may be partitioned into multiple logical banks, such as memory banks 136a-136g. The spare bank 132 may be used to replace one of the banks 136a-136g during failure of the one bank.

The physical memory 130 may store one or more software applications (not shown) that are later compiled and loaded into the cache memory subsystem. Generally speaking, for a given software application, the kernel of an operating system sets up an address space for the application, loads the application's code into the physical memory 130, sets up a stack for the application, branches to a given location inside the application, and begins execution of the application. Dynamic objects accessed with pointers may be allocated during program execution. As shown, one or more arrays 138a-138c of bytes may be allocated during the execution of one or more software applications. It is noted that while arrays are used herein for purposes of discussion, the methods and mechanisms may be applied to other types of data structures.

In one embodiment, when there has been no hardware failure of the DRAM, or there are otherwise spare banks available, each of the allocated arrays 138a-138c may have associated version bits 134a-134c stored in the spare bank 132. As used herein, "version bits" generally refers to one or more bits used as a tag or identifier. The spare bank 132 may be borrowed for the purpose of storing the version bits to be used for memory corruption detection. An access to a memory location within one of the allocated arrays 138a-138c by a read or a write operation causes the data stored in that memory location to be returned to the processor 102. The associated version bits for the accessed memory location may be returned to the processor along with the data where they may then be stored with (or in association with) the data. For example, if a memory location within the allocated array 138a is accessed, then the version bits 134a may be returned to the processor 102 along with the accessed data within the allocated array 138a. In various embodiments, these version bits are also stored at one or more (e.g., all) cache levels as well. For example, versions bits may be stored in association with the data in the cache(s) and typical cache coherency protocols may be used to access the data and corresponding versions bits. On a cache miss at the lowest level (e.g., L3), the data and version bits may be retrieved from memory.

Each memory access may utilize both an address and a version number indicated by the version bits. In one embodiment, when data is written to memory, the hardware in the processor 102, in the cache controller 114 or in the memory controller 120 may verify the version bits from the store operation match the associated version bits recorded in the spare bank 132. When data is loaded, a similar process may occur. An error may be flagged when a mismatch is found. Therefore, memory corruption is detected without software tools.

Dangling pointers, which are also called stale pointers, are costly to detect with dynamic software monitoring tools, since instrumentation slows system performance. Reliable memory corruption detection is important for both the operating system (OS) and any database. Notifying a trap handler when a mismatch in the version bits occurs during a memory access allows the OS to take corrective action with little overhead.

In the event of a hardware memory failure in the DRAM in physical memory 130, the spare bank 132 may become active and begin to store program data. In this case, the version bits 134a-134c may no longer be stored and used for memory corruption detection. However, in this case, the system 100 may be soon shutdown, one or more DIMMs in the DRAM may be replaced and the system 100 may be restarted. Afterward, the spare bank 132 may be used again to store version numbers associated with allocated arrays. Before the system shutdown, in one embodiment, the physical memory 130 or the memory controller 120 may return a value of zero to the processor 102 for any associated version number for a memory access. The value of zero may indicate a "not set" state for the version number. In this case the hardware in the processor 102, the cache controller 114 and the memory controller 120 may not compare the version bits provided by the application against those provided by hardware. In one embodiment, the application may continue running although the memory location was not one that was supposed to be accessible through the pointer used by the software. In another embodiment, portions of the spare bank 132 may still store one or more of the version bits 134a-134c during a hardware failure. Returning a state value of "not set" for a given version number may depend on which portion of the spare bank 132 is used for hardware failure and which portion is still used for version number storage.

Figure 2:
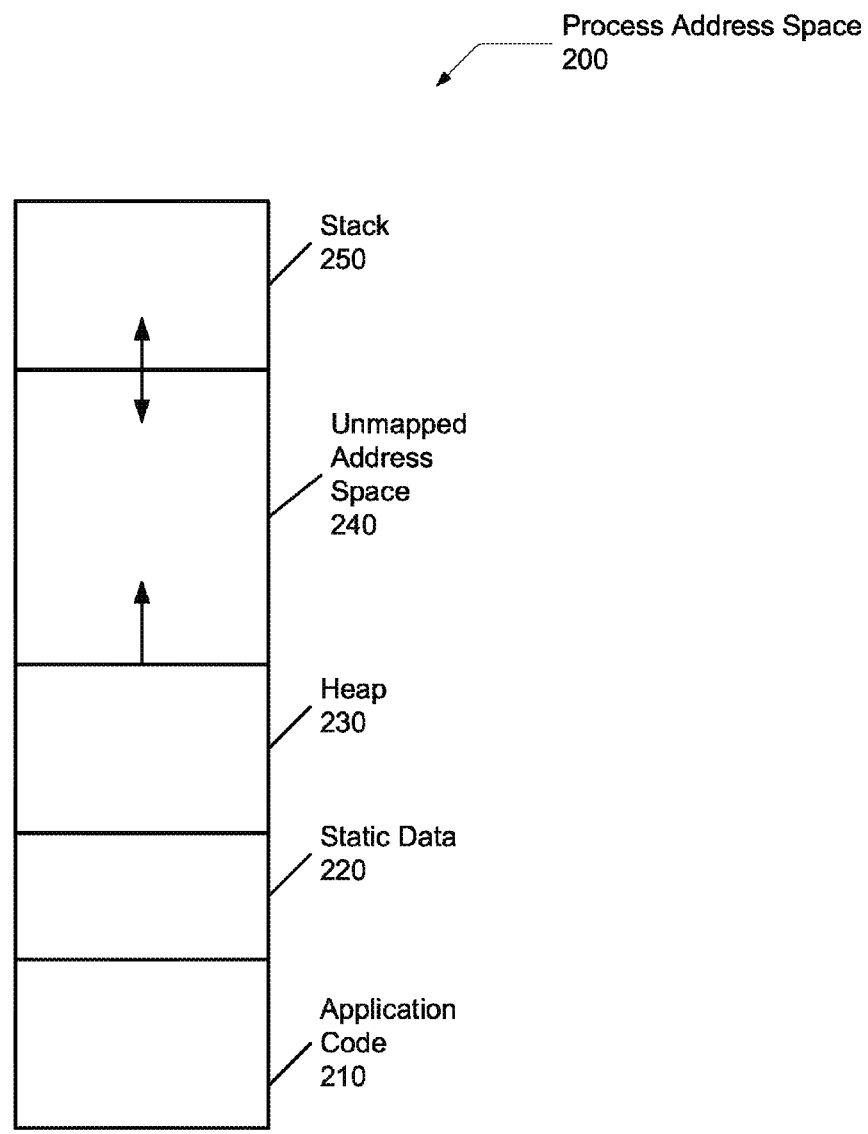
FIG. 2 is a generalized block diagram illustrating one embodiment of a process address space.

Referring now to FIG. 2, a generalized block diagram illustrating one embodiment of a process address space 200 is shown. As described above, the address space 200 for a given process may be a contiguous virtual address space, wherein a mapping between virtual addresses and physical addresses determines the location of data values and application code in physical memory 130. The interaction of compilers and high-level languages affects how a software application uses an instruction set architecture (ISA). Software application development uses a number of variables to be allocated and addressed and a number of registers used to allocate variables. In one embodiment, the static data 220, the stack 250, and the heap 230 determine data allocation for the application code 210.

The static data 220 may be used to allocate statically declared objects, such as global variables and constants. A majority of these objects may be arrays. The stack 250 may be used to allocate scalar variables rather than arrays, such as local variables and parameters in the functions currently being invoked. The stack 250 may be grown and shrunk on procedure call or return, respectively. The heap 230 may be used to allocate dynamic objects accessed with pointers and are typically not scalar variables. The heap 230 may be used to reduce the frequency of copying the contents of strings and lists by storing the contents of temporary strings or lists during the string/list operations. The heap is not affected by the return of the function call.

Figure 3:
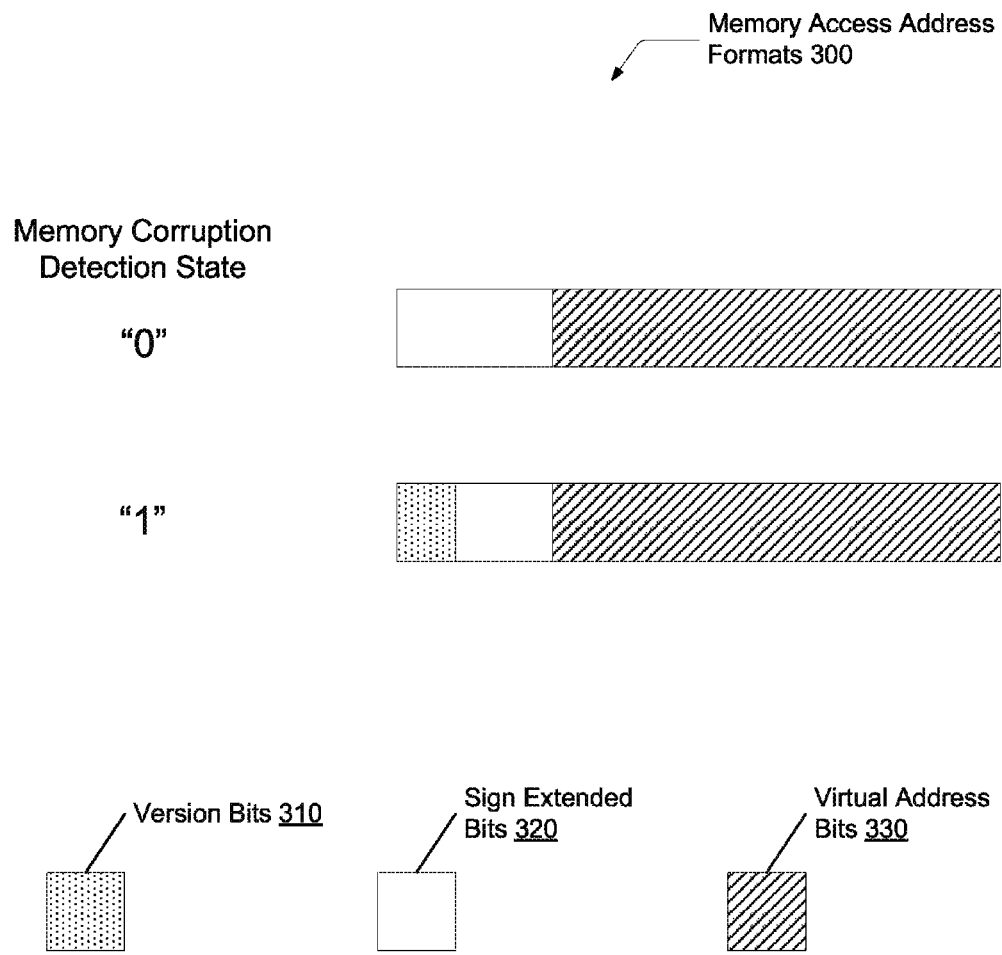
FIG. 3 is a generalized block diagram illustrating one embodiment of memory access address formats.

Turning now to FIG. 3, a generalized block diagram illustrating one embodiment of memory access address formats 300 is shown. Modern computing systems use virtual memory in order to share a smaller amount of physical memory among many processes. An address space may be a contiguous virtual address space, wherein a mapping between virtual addresses and physical addresses determines the location of stored data in physical memory.

When software allocates a region of memory, such as with a calloc or a malloc C++ subroutine used for dynamic memory allocation, a tag or "version number" may be assigned to the allocated array. In one embodiment, a subroutine and/or a heap manager may utilize a modified block initialization store instruction (e.g., within an iterative loop) to zero out the allocated array. This modified instruction may operate on a cache line basis. For example, 128 modified block store instructions may be used to allocate an 8-kilobyte (KB) array, wherein each cache line is 64 bytes. In addition, the modified block store instruction may cause an associated version number to be stored in spare bank 132 shown in FIG. 1.

In one embodiment, the OS is made aware of extra metadata being used for memory access operations through a state bit, such as a memory corruption detection (mcd) state bit. In one embodiment, when the mcd state bit is not asserted, the most-significant bit (MSb) of the virtual address bits 330 is sign extended to provide the sign-extended bits 320. In one embodiment, if the bits 320 do not equal a sign-extended value of the MSb of the virtual address bits 330, then an exception may occur.

In one embodiment, when the mcd state bit is asserted, the MSb of the virtual address bits 330 is sign-extended for a smaller portion of the total address. The sign-extended value 320 is smaller in this case. In one embodiment, the upper bits of the memory access address store an associated version number 310 to be used for later comparisons. In one embodiment, the memory access address is a 64-bit value. The virtual address 310 comprises bits 53 to 0. When the mcd state bit is asserted, the sign-extended value 320 comprises bits 59 to 54 and the version number 310 comprises bits 63 to 60. Although the bits in the memory access addresses are shown in this particular order, other combinations are possible and other or additional bits may be utilized as well. The bits storing information for the portions 310-330 may or may not be contiguous. Similarly, the arrangement of the portions 310-330 may use other placements for better design trade-offs.

Turning now to FIG. 4, a generalized block diagram illustrating one embodiment of a truth table 400 for a version number mismatch is shown. In one embodiment, the possible values for a version number may be used in either an available set or a reserved set. The one or more version numbers in a reserved set may indicate either memory is not utilizing version numbers or memory is unable to utilize version numbers. For example, when a hardware failure occurs in the DRAM and a failover mechanism begins to use the spare bank 132, the stored version numbers may not be used anymore. In another example, an uncorrectable error has occurred and the memory does not return valid data.

In one embodiment, one value for the reserved set may be sufficient to handle the conditions described above. However, another version number value may be used in the reserved set to ease software adoption of the mcd state. For example, as shown in FIG. 2, the heap 230 may occupy a lower half of a virtual address space. In such a case, the most-significant bits of an associated virtual address may comprise binary 0's. The stack 250 and shared libraries may occupy an upper half of the virtual address space. The most-significant bits of an associated virtual address may comprise binary 1's. A single version number value in the reserved set may make it difficult for software, such as the OS, to determine if pointers to the upper half of the virtual address space have associated version numbers in the available set. As used herein, a "pointer" may refer to any identifier which is usable to identify a location within memory. For example, for a 4-bit version number 0xF, wherein 0x denotes a hexadecimal value, this value may indicate either an associated memory access address corresponds to a memory location with a version number equal to 0xF or the memory access address corresponds to a memory location that is not assigned a version number. To simplify logic, both a 0x0 value and a 0xF value may be placed in the reserved set. For the 4-bit version number example, the other values between 0x0 and 0xF may be placed in the available set.

The software may use the version number values in the available set for assigning version numbers to allocated arrays 138a-138c. The values "A" and "B" represent two different members of the available set, but the values A and B do not equal one another. In one example, when a version number comprises 4 bits, a reserved set may include the 2 values 0x0 and 0xF, and an available set may include the 14 values 0x1 to 0xE. Accordingly, if 4 bits are used for each 64 byte cache line, the overhead for storage of the versions bits is <0.8%.

As shown in the truth table 400, a version mismatch may occur when a version number in a memory access address corresponding to a load or a store operation from the processor 102 is in the available set, but it does not match the version number stored in the spare bank 132 associated with the memory location identified by the memory access address. In addition, the version number stored in the spare bank 132 is in the available set for a mismatch to occur. When a version number stored in the spare bank 132 is within the reserved set, a mismatch does not occur as shown in the table.

Figure 5:
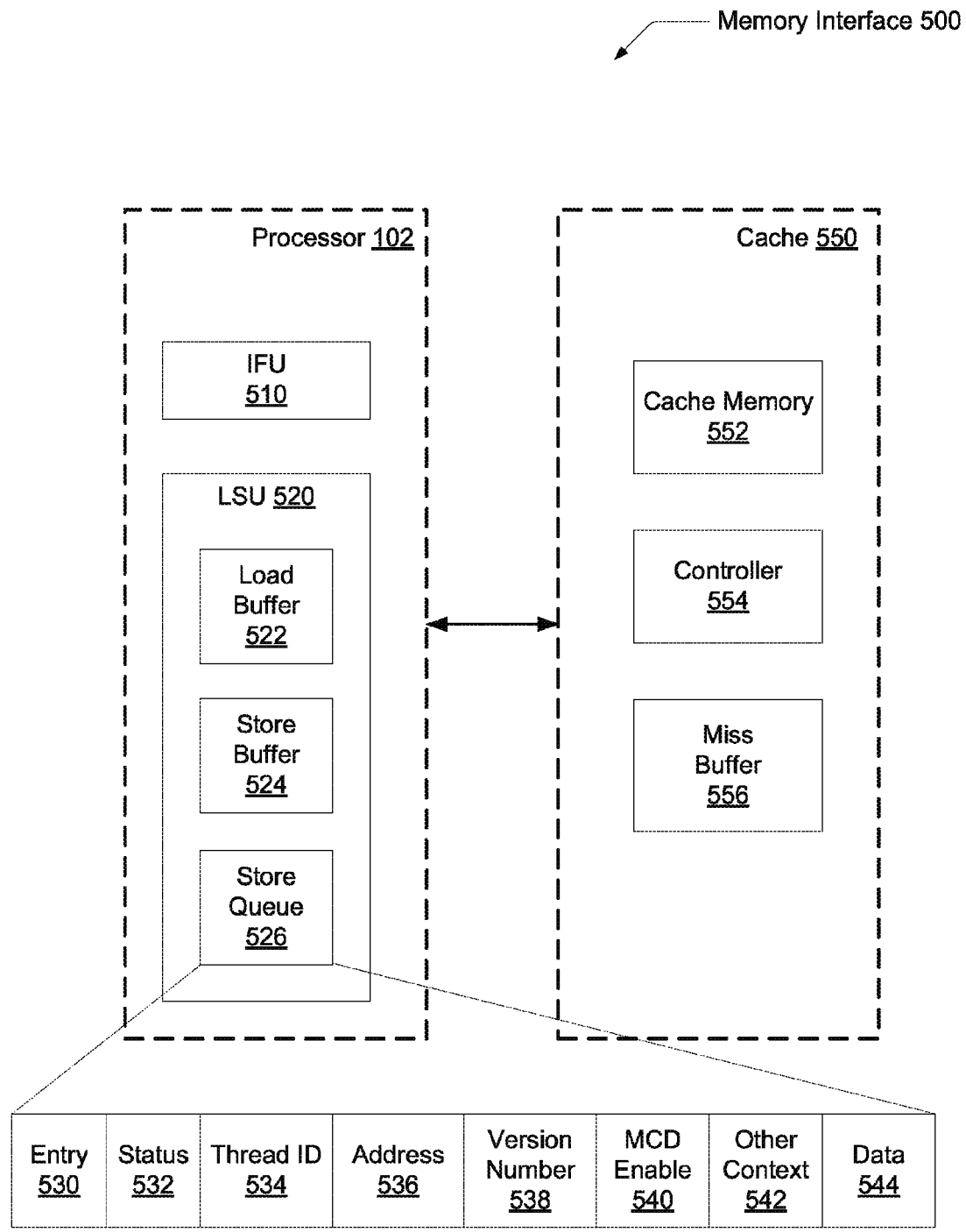
FIG. 5 is a generalized block diagram illustrating one embodiment of a memory interface illustrating different sources of memory requests.

Referring now to FIG. 5, a generalized block diagram illustrating one embodiment of a memory interface 500 illustrating different sources of memory requests is shown. It is noted the components shown in FIG. 5 illustrate a general organization and coupling of components, rather than an actual physical placement of the components. In one embodiment, a cache 550 comprises a cache memory 552, a cache controller 554 and a miss buffer 556. The cache 550 may correspond to an on-core L2 cache with an accompanying miss buffer 556.

Cache memory 550 may be larger than a previous level of memory in the hierarchy, such as an L1 cache in processor 102. Cache memory 550 may contain all of the cache lines of a previous level. In one embodiment, in order to remove complexity from a L1 cache, the L1 cache is implemented as a write-through cache and an L2 cache manages memory ordering and coherency issues. Therefore, memory requests within processor 102 may be sent to both a L1 cache and a L2 cache, such as cache 550.

Memory requests may originate at least from an instruction fetch unit (IFU) 510, a load buffer 522 and a store queue 526 within a load-store unit (LSU) 520. The IFU 510 may be configured to select a thread to be fetched and to fetch instructions from an instruction cache (i-cache) for the selected thread, which may correspond to an L1 cache with a corresponding L2 cache 550. The store queue 526 may be configured to convey memory requests to the same L1 and L2 caches for chosen threads in order to write-out data of committed store instructions for a chosen thread. The load buffer 522 may be configured to convey memory requests to the same L1 and L2 caches for a chosen thread in order to read data of load instructions being executed.

In one embodiment, the miss buffer 556 comprises a plurality of entries that queues all read and write operations, such as load, fetch, and store instructions, which encounter conditions which prevent them from completing. For example, a requested cache line may not be present in cache memory 552. Alternatively, a requested cache line may be present in cache memory, but it does not have a particular cache coherency state. For example, cache memory 552 may be chosen to be a global ordering point for a memory model. In order to adhere to the rules of a memory model, there may need to be a global ordering point within the memory hierarchy, such as cache memory 552 that may be a L2 cache with an associated write-through L1 cache, that serves as the reference for all store operations. This global ordering point may be responsible for ensuring that all consumers will see a consistent and proper ordering of store operations. This is typically accomplished by requiring that a cache line be in an exclusive state before executing a store operation. If a cache line is not in an exclusive state, a cache miss occurs and an updated corresponding cache line may need to be acquired.

In one embodiment, the store queue (SQ) 526 holds all committed store instructions or operations of all threads in processor 102. When a store instruction commits, it typically is moved from the store buffer 524 to the store queue 526. In one embodiment, the store buffer 524 and the store queue 526 store the same fields 530-544. However, when a store instruction commits, the version number 538, the mcd enable state 540, and other context information 542 may no longer be associated with the address 536. Instead this information may be associated with the data 544. The buffered store operations may also be micro-operations, or micro-ops, if processor 102 is configured to divide instructions into two or more operations.

The store queue 526 may be used for read-after-write (RAW) hazard checking as all load instructions, or operations, may check the store queue 526 for RAW hazards prior to being issued. The data 544 holds the data of committed store instructions until these instructions write-out data to cache 550 and the corresponding data of the store instruction are now globally visible to all processors and threads within a computing system. For a particular load instruction, when a RAW hazard is detected in the store queue 526 for a particular entry, which has valid data, bypass may occur immediately.

The store queue 526 comprises a plurality of entries, wherein each entry corresponds to a store instruction. In one embodiment, each entry includes an entry number 530, status information 532, a thread identification (TID) number 534, an address 536, a version number 538, memory corruption detection enable state 540, and other context identifying information 542. The other context information 542 may include mcd enable checking state information on a thread basis. Although the fields are shown in this particular order, other combinations are possible and additional fields may be utilized. The bits storing information for the fields 530-542 may or may not be contiguous. Similarly, the arrangement of fields 530-542 may use other placements for better design trade-offs. The entry number 530 corresponds to the position of an entry in the store queue 526, wherein entry 0 may be configured to be at the top or at the bottom of the store queue 526 depending on logic preferences. The entry field 530 may be implied rather than an actual stored number. A resource tag, or store queue tag, corresponding to a single store instruction in a core pipeline within processor core 102 may be also held per entry in the store queue 526.

Status information 532 may comprise one or more valid bits and cache line MESI protocol information associated with corresponding data stored in the store buffer 524. A thread identifier (TID) 534 may be used to identify a corresponding thread for a particular store operation. In one embodiment, the address field 536 may hold a physical address and a byte mask. Entries may be written upon the retirement of a store instruction. Load instructions may initiate a content-addressable-memory (CAM) comparison operation, typically implemented via dynamic circuit logic, in order to check for an address overlap. In one embodiment, an address overlap occurs when the address 536 matches, the thread ID 534 matches, and any bit in the load mask has a match in the store mask. For entries with address overlap, the CAM will also check for full or partial matches. A full match occurs when each bit in the load mask has a corresponding bit in the store mask. Otherwise, the match is partial. The version number 538, the mcd enable state 540, and the other context information 542 may not participate in a typical CAM operation within the store buffer 524.

Figure 6:
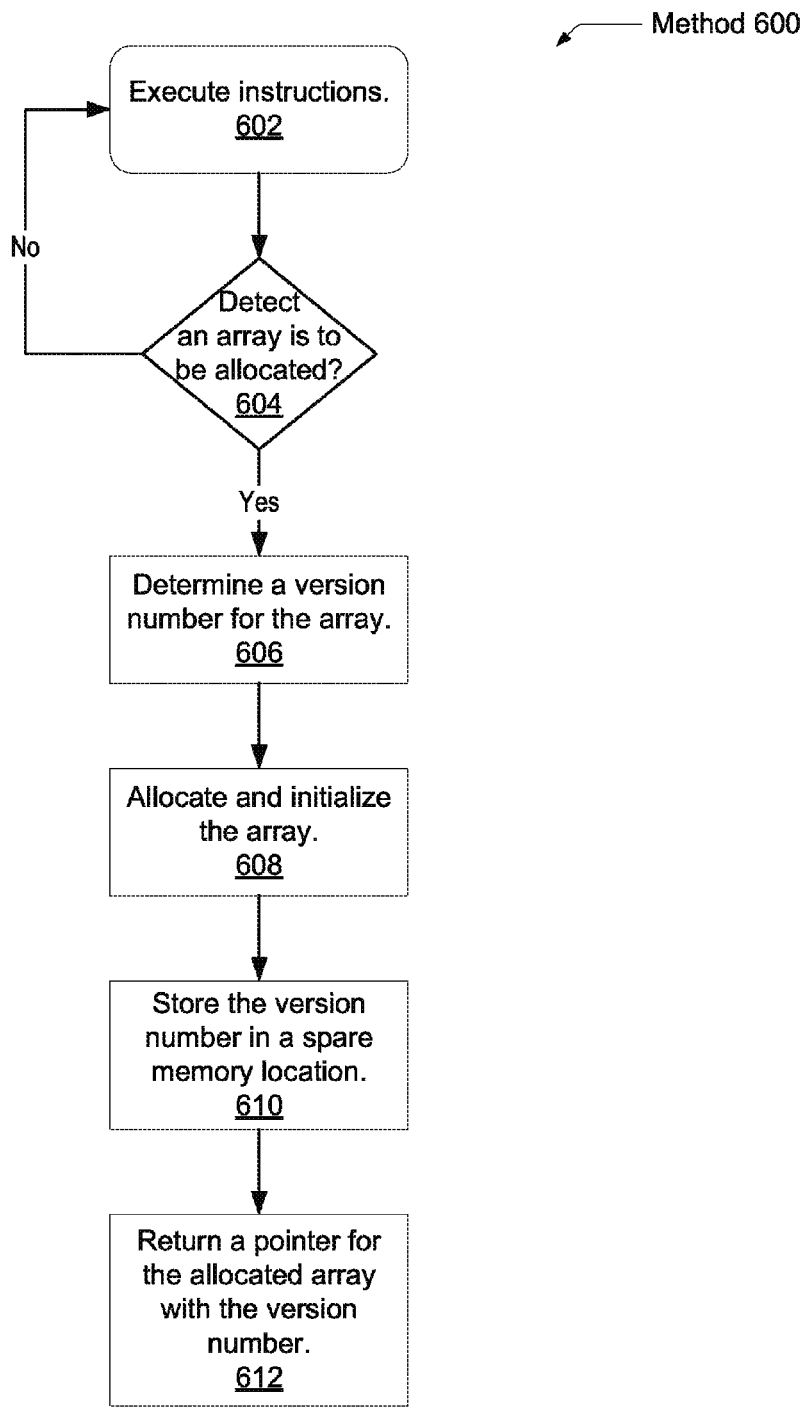
FIG. 6 is a generalized flow diagram illustrating one embodiment of a method for initializing an array with a version number.

Referring now to FIG. 6, a generalized flow diagram illustrating one embodiment of a method 600 for initializing an array with a version number is shown. The components embodied in system 100 described above may generally operate in accordance with method 600. For purposes of discussion, the steps in this embodiment are shown in sequential order. However, some steps may occur in a different order than shown, some steps may be performed concurrently, some steps may be combined with other steps, and some steps may be absent in another embodiment.

In block 602, the processor 102 may be executing instructions of one or more threads corresponding to one or more software applications. The processor 102 may fetch instructions concurrently for one or more threads. These fetched instructions are decoded. As described earlier, dynamic objects accessed with pointers may be allocated during program execution. In one embodiment, a calloc subroutine or a malloc subroutine used in the C and C++ programming languages is called for dynamic allocation of memory.

If an array of bytes to be allocated is detected during execution (conditional block 604), then in block 606, a version number is determined for the array. As described earlier, version numbers may belong to one of two categories, such as a reserved set and an available set. In one embodiment, a value within the available set of version numbers that has not already been assigned may be chosen. In one embodiment, the OS determines the values within each of the reserved set and the available set and chooses the version number for the array to be allocated. The OS may perform the determination and the selection when the OS receives an indication from the processor 102 that a dynamic memory allocation subroutine is being executed. In another embodiment, the processor 102 determines the values within each of the reserved set and the available set and chooses the version number for the array to be allocated. The processor may send the selected version number with an accompanying indication to the OS that a dynamic memory allocation subroutine is being executed.

In block 608, the subroutine for dynamic memory allocation is executed with a modified block initialization store instruction. The subroutine may use this instruction in an iterative loop. For example, 128 loop iterations, each with the modified block store instruction, may be used to allocate an 8 kilo-byte (KB) array, wherein each cache line allocated by a single iteration is 64 bytes. This modified block initialization instruction may store zeros to the entire cache line pointed to by the variable address. In one embodiment, the version number may be recorded in the upper bits of the address.

In block 610, during execution, the modified instruction may extract these upper bits and place these bits in a memory location in the spare bank 132 associated with a memory location in one of the memory banks 136a-136g identified by the remaining bits of the address. This version number may be carried along with an associated cache line throughout the entire memory system.

When the calloc, malloc or similar subroutine completes, in block 612, the subroutine returns a pointer value and a range of physical memory, which identifies the allocated and initialized array in virtual memory. In one embodiment, a lower portion of a register, such as the lower 54 bits, may be used to identify locations within a virtual memory. The subroutine may return the pointer value with the most significant bits holding the version number. For example, a 64-bit virtual address may hold a 4-bit version number in bits 63 to 60. References to the virtual memory using load and store instructions may be performed with this pointer value and the range of physical memory for the allocated array. Setting the bits in the pointer to hold the version number may be performed using logical operations. Setting the bits in the spare bank 132 in physical memory 130 may be performed by storing the version number value in each memory location in the spare bank 132 corresponding to the allocated array.

Figure 7:
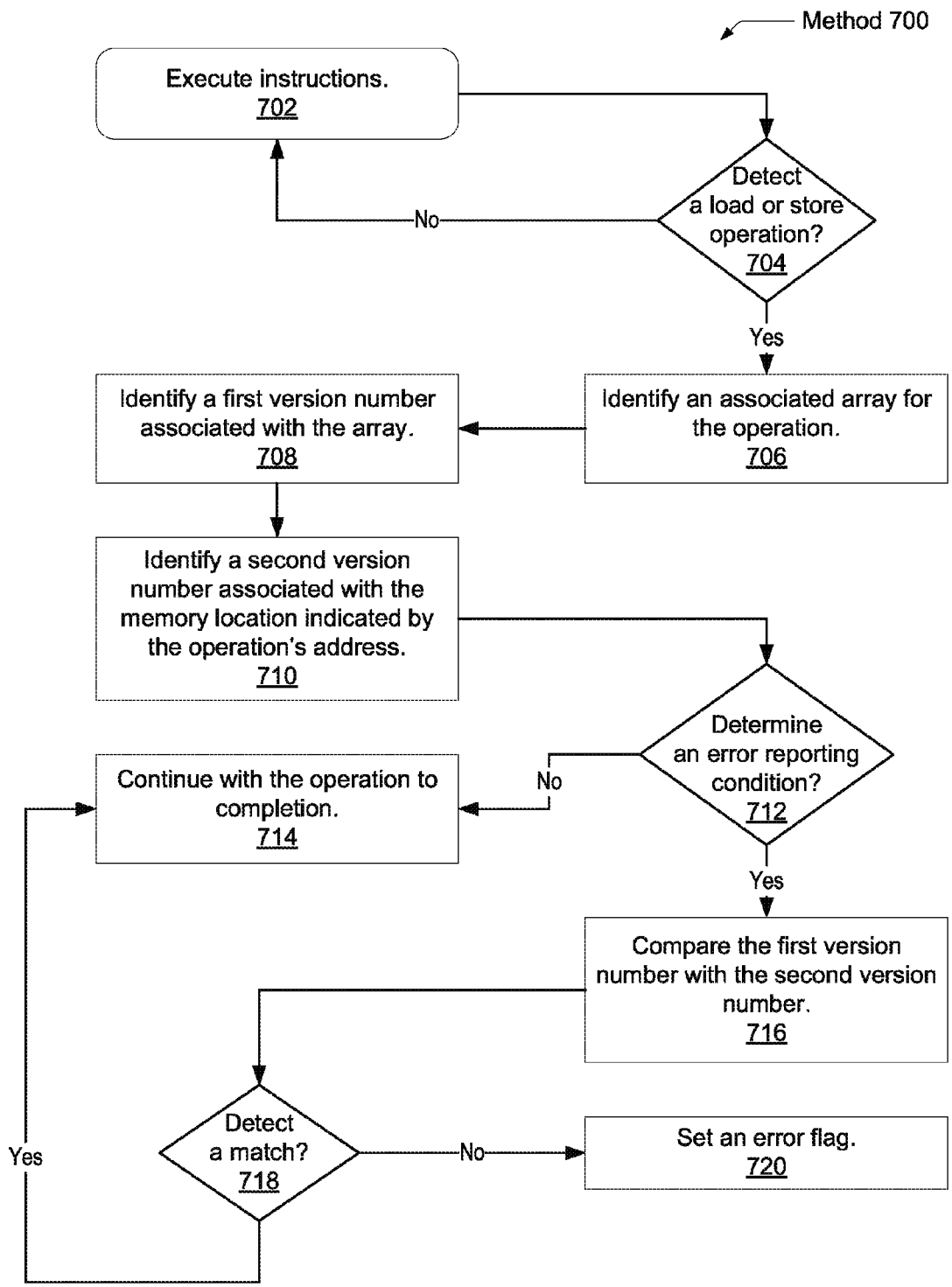
FIG. 7 is a generalized block diagram illustrating one embodiment of a method for executing memory access operations with a version number.

Referring now to FIG. 7, a generalized block diagram illustrating one embodiment of a method 700 for executing memory access operations with a version number is shown. The components embodied in system 100 described above may generally operate in accordance with method 700. For purposes of discussion, the steps in this embodiment are shown in sequential order. However, some steps may occur in a different order than shown, some steps may be performed concurrently, some steps may be combined with other steps, and some steps may be absent in another embodiment.

Similar to block 602 in method 600, in block 702, the processor 102 may be executing instructions of one or more threads corresponding to one or more software applications.

If a memory access operation, such as a load or a store instruction, is detected during execution (conditional block 704), then in block 706, an associated array is identified for the operation. The associated pointer value returned in step 612 of method 600 may be additionally identified in this step.

In block 708, a first version number associated with the array is identified. For example, this first version number may be stored in the upper bits of the pointer value as described above. In block 710, a second version number is identified, wherein the second version number is associated with a memory location indicated by the memory access operation's address. For example, an array may be identified in block 706 and an associated pointer value identified in block 708. This array may hold 100 cache lines of information. The identified pointer value and the size of 100 cache lines may be both used to generate particular addresses. These particular addresses may correspond to memory access operations within an iterative loop in a computer program. For example, the pointer value may identify a cache line at the start of the array, such as Start+0. A cache line at the end of the array may be identified by the generic address Start+99 used as a simple illustration. However, memory corruption may cause an incorrect address to be used and a cache line identified by Start+100 may be accessed during the iterations of the loop.

In one embodiment, a memory corruption error reporting condition may include an asserted mcd state and determination that the second version number stored in memory is not a value in the reserved set. If this error reporting condition is false (conditional block 712), then in block 714, the memory access operation continues to execute to completion. If this error reporting condition is true (conditional block 712), then in block 716, the first version number is compared with the second version number.

In one embodiment, the above comparison is performed for a store instruction when the store instruction commits, reaches the head of the store queue, and is sent by a write-through mechanism to the L2 cache. The first version number is stored in the store address. The second version number is stored in the L2 cache. An associated L2 cache controller may perform the comparison of the first version number and the second version number. For a load instruction, a core within the processor 102 may send a load address with the first version number to the L1 cache. A returned cache line from the L1 cache may store the second version number. The core within the processor 102 may compare the first version number and the second version number. In one embodiment, no comparisons may be performed for prefetched cache lines until an executing computer program actually requests these prefetched lines.

If the above comparison finds a match (conditional block 718), then control flow of method 700 moves to block 714 where the memory access operation continues to completion. If the above comparison finds a mismatch (conditional block 718), then in block 720, an error flag or trap is set.

In one embodiment, a trap logic unit (TLU) within a core of the processor 102 may be configured to receive notification of an exceptional event occurring during execution of a particular thread, such as the mismatch found during the above comparison. For a load instruction, the mismatch may be found and reported by circuitry within the processor 102 corresponding to a load buffer. For a store instruction, the mismatch may be found and reported by a cache controller associated with the L2 cache as described above. The cache controller may send an indication to a core within the processor 102 corresponding to a found mismatch. The load-store unit (LSU) 520 may store information identifying a given store operation that commits and leaves the store queue 526 in case the given store operation later causes the trap. The identifying information may be used for later debugging processes.

The TLU may cause execution control of that thread to vector to a supervisor-mode software handler (i.e., a trap handler) corresponding to the detected event. In one embodiment, the TLU may be configured to flush all instructions from the trapping thread from any stage of processing within an associated core within the processor 102 without disrupting the execution of other, non-trapping threads.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computing system comprising:
a processor;
a physical memory coupled to the processor; and
an operating system (OS);
wherein the processor is configured to:
   detect a first data structure is to be allocated in the physical memory;
   send an indication to the OS to allocate the first data structure in the physical memory;
   receive from the OS a pointer indicating a first location in the physical memory where the first data structure is stored;
   associate a first version number with the first data structure; and
   store the first version number in a second location in the physical memory, wherein the second location is associated with the first location;
wherein the physical memory comprises a plurality of banks, and wherein the first data structure is stored in a first bank of the plurality of banks, and the first version number is stored in a spare bank corresponding to the first bank;
wherein in response to a failure of the first bank and lack of an additional spare bank corresponding to the first bank, data corresponding to the first bank is copied to the spare bank and no version number is stored for the data copied to the spare bank.

2. The computing system as recited in claim 1, wherein in response to a new memory allocation, the processor is configured to associate a new version number with the new memory allocation, wherein the new version number is different from a version number associated with a most recent memory allocation.

3. The computing system as recited in claim 1, wherein said pointer includes a subset of bits which are used for identifying a memory location, and one or more bits which are unused for purposes of identifying the memory location, and wherein the processor is configured to use the one or more bits to convey the first version number.

4. The computing system as recited in claim 3, wherein when accessing the first data structure, the processor is further configured to:
- compare an expected version number to a version number stored with the first data structure; and
- detect an error in response to determining the expected version number does not match the version number stored with the first data structure.

5. The computing system as recited in claim 4, wherein the processor is further configured to generate an indication of an error in response to detecting said error.

6. The computing system as recited in claim 4, wherein the processor is configured to generate said indication of an error in further response to detecting a memory corruption detection state is enabled.

7. The computing system as recited in claim 6, wherein the error-reporting condition further comprises a determination the physical memory does not hold a value indicating a hardware failure occurred in a portion of the physical memory corresponding to the first data structure.

8. A method for a processor, the method comprising:
- detecting a first data structure is to be allocated in the physical memory;
- determining a first version number corresponding to the first data structure;
- sending an indication to the OS to allocate the first data structure in the physical memory;
- receiving from the OS a pointer indicating a first location in the physical memory where the first data structure is stored;
- associating a first version number with the first data structure; and
- storing the first version number in a second location in the physical memory, wherein the second location is associated with the first location;
- wherein the physical memory comprises a plurality of banks, and wherein the first data structure is stored in a first bank of the plurality of banks, and the first version number is stored in a spare bank corresponding to the first bank;
- wherein in response to a failure of the first bank and lack of an additional spare bank corresponding to the first bank, data corresponding to the first bank is copied to the spare bank and no version number is stored for the data copied to the spare bank.

9. The method as recited in claim 8, wherein in response to a new memory allocation, the method further comprises associating a new version number with the new memory allocation, wherein the new version number is different from a version number associated with a most recent memory allocation.

10. The method as recited in claim 8, wherein said pointer includes a subset of bits which are used for identifying a memory location, and one or more bits which are unused for purposes of identifying the memory location, and wherein the method comprises using the one or more bits to convey the first version number.

11. The method as recited in claim 10, wherein when accessing the first data structure, the method further comprises:
- comparing an expected version number to a version number stored with the first data structure; and
- detecting an error in response to determining the expected version number does not match the version number stored with the first data structure.

12. The method as recited in claim 11, further comprising generating an indication of an error in response to detecting said error.

13. The method as recited in claim 11, wherein the error-reporting condition comprises at least a memory corruption detection state is enabled.

14. The method as recited in claim 13, generating said indication of an error in further response to detecting a memory corruption detection state is enabled.

15. A processor comprising:
- a first interface to a memory subsystem comprising at least a physical memory;
- a second interface to an operating system (OS);
- a multi-stage pipeline for executing instructions received via the first interface; and
- circuitry;
- wherein the circuitry is configured to:
  - detect a first data structure is to be allocated in the physical memory;
  - send an indication to the OS to allocate the first data structure in the physical memory;
  - receive from the OS a pointer indicating a first location in the physical memory where the first data structure is stored;
  - associate a first version number with the first data structure; and
  - store the first version number in a second location in the physical memory, wherein the second location is associated with the first location;
- wherein the physical memory comprises a plurality of banks, and wherein the first data structure is stored in a first bank of the plurality of banks, and the first version number is stored in a spare bank corresponding to the first bank;
- wherein in response to a failure of the first bank and lack of an additional spare bank corresponding to the first bank, data corresponding to the first bank is copied to the spare bank and no version number is stored for the data copied to the spare bank.

16. The processor as recited in claim 15, wherein in response to a new memory allocation, the processor is configured to associate a new version number with the new memory allocation, wherein the new version number is different from a version number associated with a most recent memory allocation.

17. The processor as recited in claim 16, wherein said pointer includes a subset of bits which are used for identifying a memory location, and one or more bits which are unused for purposes of identifying the memory location, and wherein the processor is configured to use the one or more bits to convey the first version number.

* * * * *